US006722006B1

(12) United States Patent
Haselmaier

(10) Patent No.: US 6,722,006 B1
(45) Date of Patent: Apr. 20, 2004

(54) SEAL RING INSTALLATION TOOL

(75) Inventor: L. Haynes Haselmaier, Picayune, MS (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 288 days.

(21) Appl. No.: 09/694,651

(22) Filed: Oct. 24, 2000

(51) Int. Cl.[7] .......................... B23P 19/04; B23P 15/10

(52) U.S. Cl. ............................. 29/238; 29/222; 29/268

(58) Field of Search ......................... 29/450, 238, 232, 29/222, 242, 281.5, 270, 268; 81/367–380, 414–426

(56) References Cited

U.S. PATENT DOCUMENTS

| | | | | | |
|---|---|---|---|---|---|
| 831,264 | A | * | 9/1906 | Charnock | |
| 3,203,221 | A | * | 8/1965 | Conner | |
| 3,455,011 | A | | 7/1969 | Harding | 29/235 |
| 3,585,704 | A | | 6/1971 | Schroeder | 29/275 |
| 4,344,215 | A | | 8/1982 | Dearman | 29/281.5 |
| 4,697,483 | A | | 10/1987 | Rodgers | 81/418 |
| 4,872,709 | A | | 10/1989 | Stack | 285/39 |
| 5,168,783 | A | | 12/1992 | Shea | 81/424.5 |
| 5,582,084 | A | | 12/1996 | Sarmiento | 81/345 |
| 6,012,362 | A | | 1/2000 | Wang | 81/368 |

* cited by examiner

*Primary Examiner*—John C. Hong
(74) *Attorney, Agent, or Firm*—Randall M. Heald; Gary G. Borda; John G. Mannix

(57) ABSTRACT

A seal ring tool that allows an installer to position a primary seal ring between hub ends of pipe flanges that are being assembled together. The tool includes a pivoting handle member and extension arms attached to the pivoting handle member. The ends of the arms have side indentation type longitudinal grooves angled toward one another for holding the primary seal ring in place between the hubs of respective pipes that are to be attached together. The arms of the tool can also have flat sides that can be used to abut against an optional second larger seal that is supported within a groove in one of the hub ends so that the second hub end can then be moved against the other side of the primary seal ring. Once the seal ring is positioned between the pipe hubs, the pipe hubs can be moved about the seal ring due to the flat sides of the arms of the tool. The tool eliminates the chances of damaging and contaminating seal rings being installed within pipe hubs that are being attached to one another.

9 Claims, 5 Drawing Sheets

SEAL RING INSTALLATION TOOL

This invention described herein was made in the performance of work under a NASA contract and is subject to the provisions of Section 305 of the National Aeronautics and Space Act of 1958, as amended, Public Law 85-568 (72 Stat. 435; 42 U.S.C. sec. 2457). This invention relates to an installation tool, and in particular to a tool for supporting and precisely locating a seal ring for installation purposes between pipe flanges that are being attached to one another without personally physically handling the seal ring nor causing any damage to the seal ring.

BACKGROUND AND PRIOR ART

Assembling pipe flange hubs together with seal rings therebetween has generally required technicians to improvise methods to correctly locate the seal ring(s) between the pipe flange hubs that are being attached to one another. Specifically, various seal ring arrangements such as Standard GRAYLOC seal rings and Reflange E-CON, R-CON, G-CON and T-CON seal rings have been used for sealing connection points between the hub areas of pipes that are being attached to one another.

Piping systems are often precision cleaned and can be easily contaminated by improper installation methods. Both the hub areas and the seal rings can be easily damaged if the seal ring is not properly aligned prior to final clamping of the connection.

Various unsuccessful methods have been used by technicians to adequately, safely, and easily locate the rings between the hubs. For example, technicians have been known to directly insert the rings between the hub areas with their fingers. This insertion technique has often resulted in personal injury such as pinched fingers to the installer.

A common installation practice has been to heavily coat the seal ring with heavy grease, and attempt to "stick" the ring in place on one hub face, while the second hub face is moved into place for the final connection assembly. This technique has caused messy surface areas of grease about the hub assembly, and has been known to fail if the ring starts to slide and shift from the initial placed position of the ring.

Other installers have been known to resort to looping a string around the seal ring and suspend it while the pipe hubs are being positioned. However, looping the string about the perimeter edges of the ring in order to suspend the ring can result in the ring slipping out of the string loop. Inserting the string into the through-hole of the ring has other problems such as how does one remove the string after the hubs are attached to one another, and leaving the string in the hub assembly can create a poor seal.

Other known failed techniques have centered around using tape, plastic wrap to temporarily hold the ring in place, and other manual positioning techniques such as using screwdriver tips, knife blades, and the like to support the ring. However, these techniques can also damage the rings, and/or further contaminate the hub assembly.

Various types of patents that would be related to the prior art include: U.S. Pat. Nos. 3,455,011 to Harding; 3,585,704 to Schroeder; 4,344,215 to Dearman; 4,697,483 to Rodgers; 4,872,709 to Stack; 5,168,783 to Shea; 5,582,084 to Sarmiento; and 6,012,362 to Wang. However none of these prior art techniques and patents is capable of allowing a suitable grasp of the various seal ring shapes so that the seal rings can be placed cleanly and safely during closure and clamping of the hub assembly.

SUMMARY OF THE INVENTION

The invention provides a seal ring installation tool that properly aligns the seal ring for installation without causing contamination and damage to the components, while eliminating potential injury to the installer's hands and fingers. The seal ring installation tool lightly clamps and holds the seal ring during an installation process and is adjustable to accommodate a wide range of seal dimensions. The seal ring installation tool is fast, clean, safe, inexpensive, and does not require any tool maintenance.

The seal ring installation tool can be used to install both ribbed and ribless seal rings. The tool has arms with flat sides that can further support an optional extra seal ring within one a pipe hub by just laying against the extra seal ring when the seal ring held by the tool is put in place.

A preferred embodiment of the tool for installing seals includes elongated first and second arms, each having outer ends that face one another with each of the ends having longitudinal grooved indentations. A handle such as a pair of pliers is attached to opposite ends of the arms and allows the arms to pivot relative to each other. The arms can be attached to the nose portions of lockable pliers, which can be adjustable to have selected openings to support different diameter seal rings. A seal having edge portions is supported by portions of the outer ends of the arms so that the seal is not compressed by the tool, and the tool allows the seal to be positioned between adjacent pipe ends. The grooves on the arm ends can have flat tipped edges with internal angles. Each arm end can have two longitudinal grooved portions. The tool can be used to support both ribless seal rings and ribbed seal rings. Each of the arms can have flat sides so that an optional second larger seal ring can be held within a groove in a first hub on one of the pipe ends as another hub is being moved against the first hub. The tool can support the seal rings between pipe ends that are to be joined together without damaging nor contaminating nor having to personally physically contact the seal rings while the seal is between the flanges to be joined together.

Further objects and advantages of this invention will be apparent from the following detailed description of a presently preferred embodiment, which is illustrated, schematically in the accompanying drawings.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

Figures 1A, 1B:
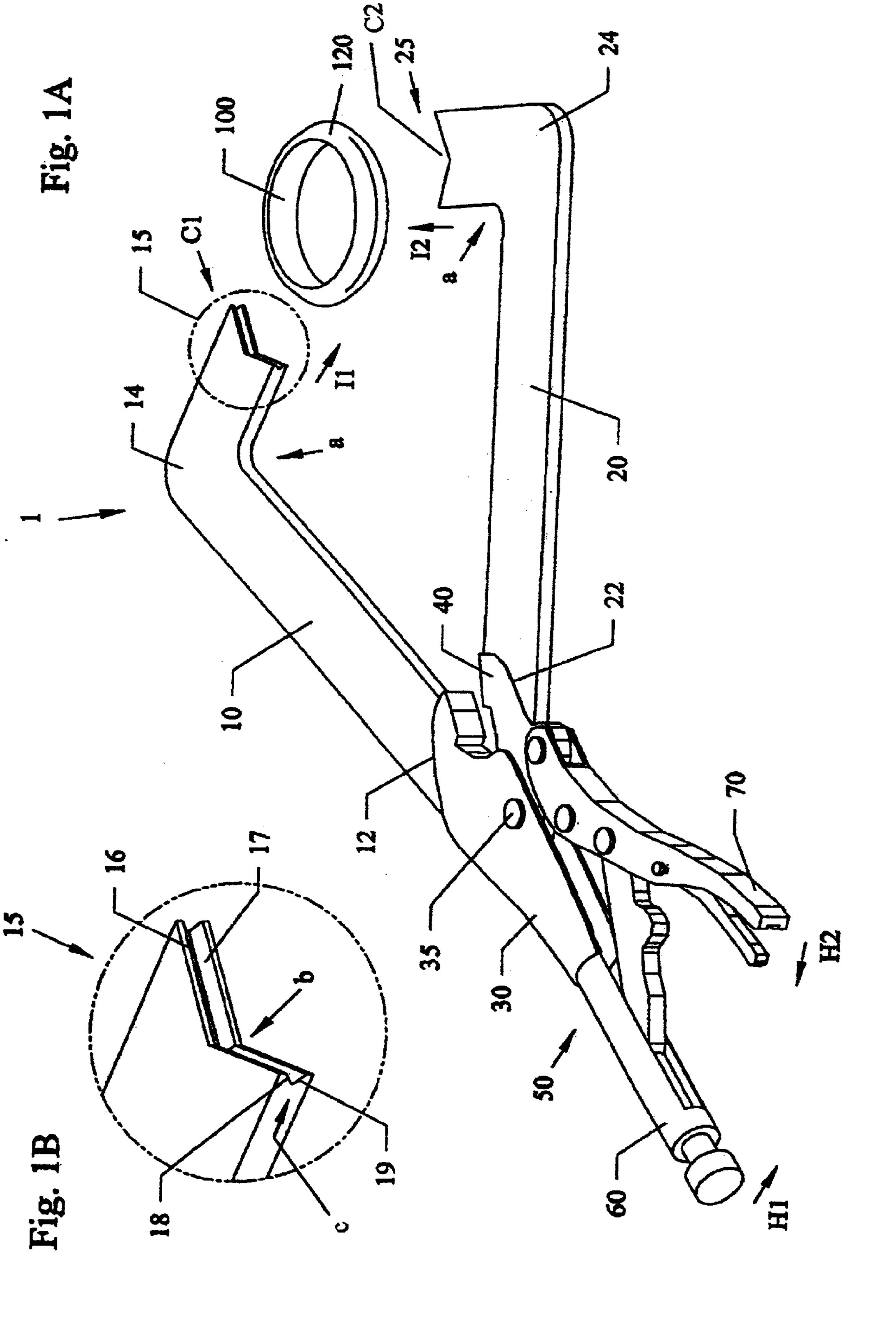
FIG. 1A is a representative perspective view of the novel seal ring insertion tool with arm ends about to be positioned about a seal ring.
FIG. 1B is an enlarged view of one of the arm ends of the tool of FIG. 1A.
Figures 2A, 2B, 2C:
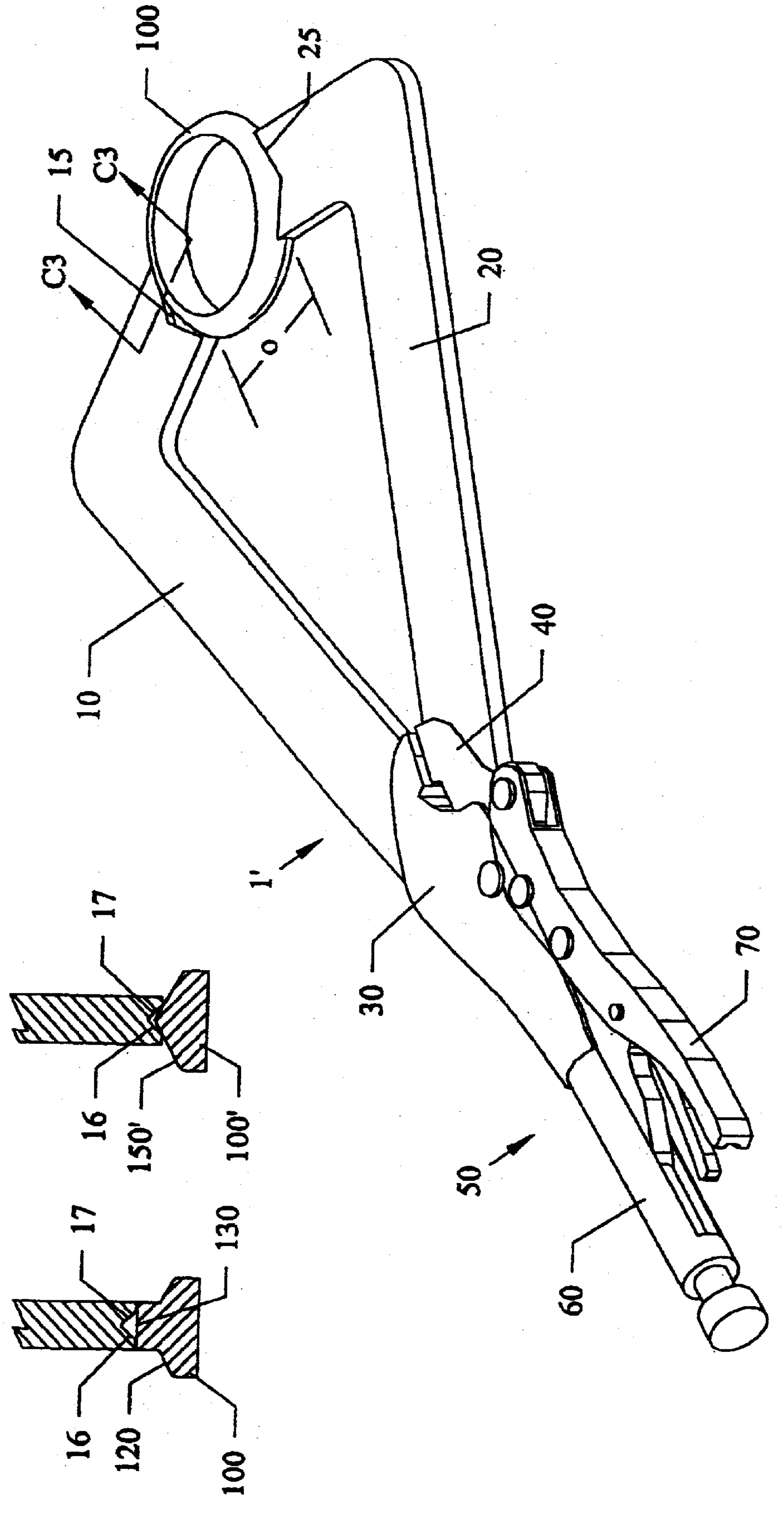
FIG. 2A shows the tool of FIGS. 1A–1B, locked about the seal ring.
FIG. 2B is a cross-sectional view of the flat tipped ends of one of the clamp arms of FIG. 1A abutting against an edge of a ribbed seal ring along arrow C3.
FIG. 2C is a cross-sectional view of the flat tipped ends of one of the clamp arms of FIG. 1A abutting against an edge of a ribless seal ring.

FIG. 1A is a perspective view of the novel seal ring insertion tool 1 with arm ends 15, 25 about to be positioned about a seal ring 100. FIG. 1B is an enlarged view of one of the arm ends 15 of the tool 1 of FIG. 1A. FIG. 2A shows the tool 1' of FIGS. 1A–1B, locked about the seal ring 100. Referring to FIG. 1A, tool 1 includes two flat sided longitudinal arms 10, 20 having inner ends 12 and 22 attached by various fastening attachment techniques such as but not limited to welds, forging, fasteners such as screws, pins, slots, and the like, to exterior surface of the jaws 30, 40 of an adjustable locking pliers 50.

Referring to FIGS. 1A, 1B and 2A, pliers 50 with moveable jaws 30, 40 can be a conventional adjustable locking pliers such as those described in U.S. Pat. No. 3,585,704 to Schroeder, which is incorporated by reference. Arms 10, 20 can be formed from a flat metal such as galvanized metal, aluminum, stainless steel, and the like. Arms 10, 20 each have an inwardly bend 14, 24 having an angle a, of approximately 105 degrees with respective clamping ends 15, 25. Angle a may vary depending upon the design of the tool and the size of the seal ring to be handled. Each of the respective clamping ends 15, 25 face each other. Each of the clamping ends 15, 25 can have identical dual longitudinal flat tipped slots (only flat tipped longitudinal slots 16–19 of clamping end 15 are shown). Each of the clamping ends has a first flat tipped longitudinal slot 16, 17 placed at an angle b of approximately 135 degrees to the other flat tipped grooved slots 18, 19 forming an angled concave type indentation therebetween. Angle b may be varied depending upon the size and shape of the seal ring to be handled. The angled concave indentation formed between inner surfaces of flat tipped slots 16 and 17, and between 18 and 19 can form an angle c, of approximately ninety degrees. Angle c may vary depending upon the seal ring specifications, especially for ribless seal rings and the concave indentation may be a rounded groove. This concave indentation allows for less contact between the surface of the seal ring and the seal ring installation tool, which results in less damage to the seal ring.

The clamping ends form an arc shaped edge that wraps about outer and side edge portions of the seal ring. The user of the pliers 50 compressing handle members 60, 70 inwardly in the direction of arrows H1 and H2, causes jaws 30, 40 of pliers 50 to pivot about connection point 35 causing angled concave indentations c1, c2 of clamping ends 15, 25 to move inwardly in the directions of arrows 11, 12 to grip about the raised exterior surface 120 of a ribbed seal ring 100. Narrow flats adjacent to the concave indentations allow effective grasp of seal rings with flats on their major diameter.

FIG. 2B is a cross-sectional view of the flat tipped ends 16, 17 of one of the clamp arms 10 of FIG. 1A abutting against a raised flat edge 130 of a ribbed seal ring 120, 100 along arrow C3. The flat outer surface perimeter 130 of ribbed seal ring 100 abuts against four flat tipped portions (only 16, 17 are shown while the flat tipped portions of 18, 19 also abut against the flat outer surface perimeter 130) of seal ring 100.

FIG. 2C is a cross-sectional view of the flat tipped ends 16, 17 of one of the clamp arms 10 of FIG. 1A abutting against a raised convex edge 150' of a ribless seal ring 100' where the raised convex edge 150' can fit within slots 16-19 of clamping end 15.

Figure 3:
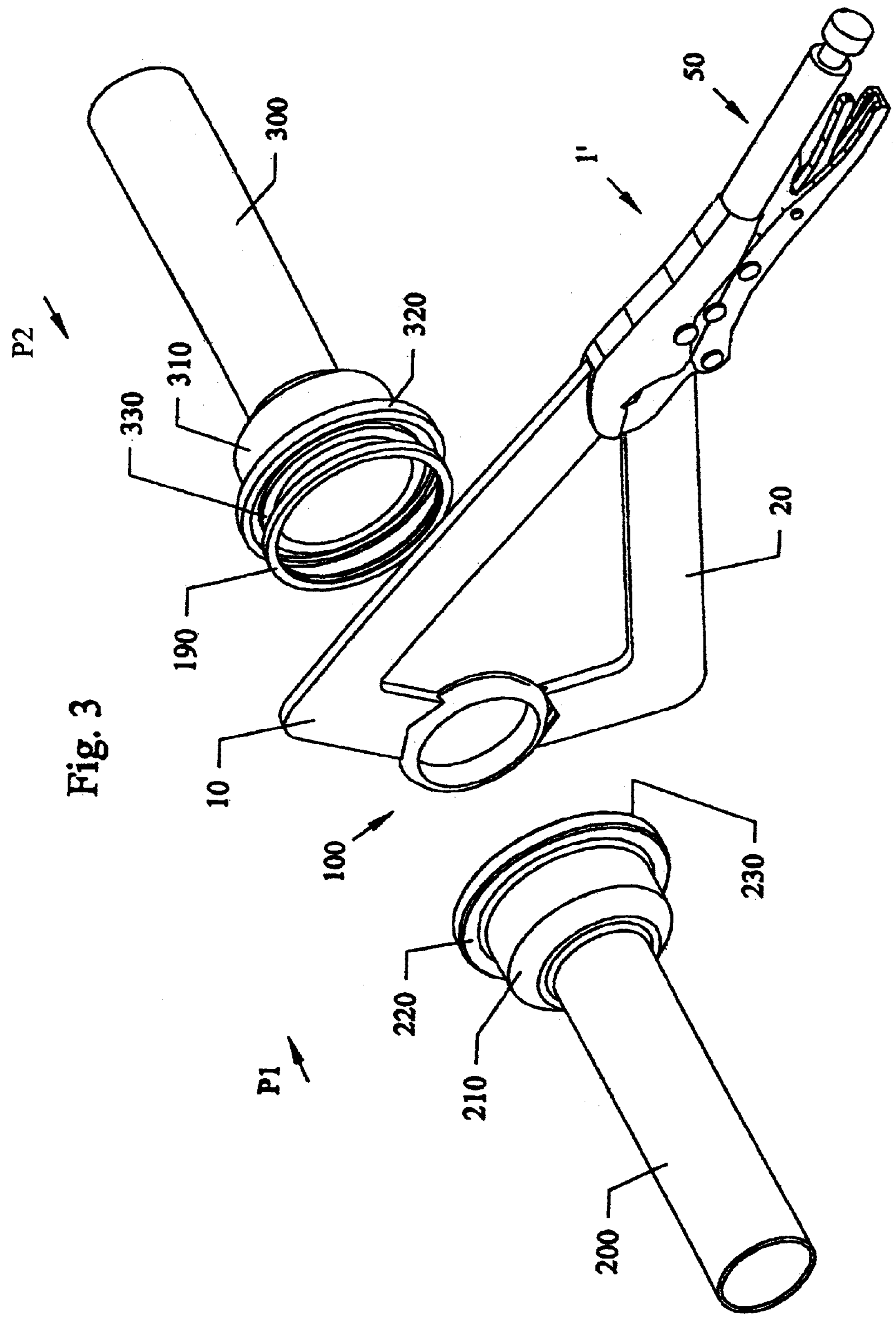
FIG. 3 shows the tool and ring of FIG. 2 with the ring being inserted into a space between two hubs that are about to be moved together.

FIG. 3 shows the tool 1' and ring 100 of FIG. 2 with the ring 100 being inserted into a space between two hubs 210, 220 and 310, 320 that are each connected about respective pipes 200, 300 that are about to be moved together. Hubs 210, 220 and 310, 320 are usually welded to their respective pipes 200, 300. Each of the hub ends 220, 320 have respective flange openings with respective interior ledges 230, 330. Seal ring 100 is intended to be inserted within the interior flange ledges 230 and 330 of the respective hub ends 220, 230.

Figure 4A:
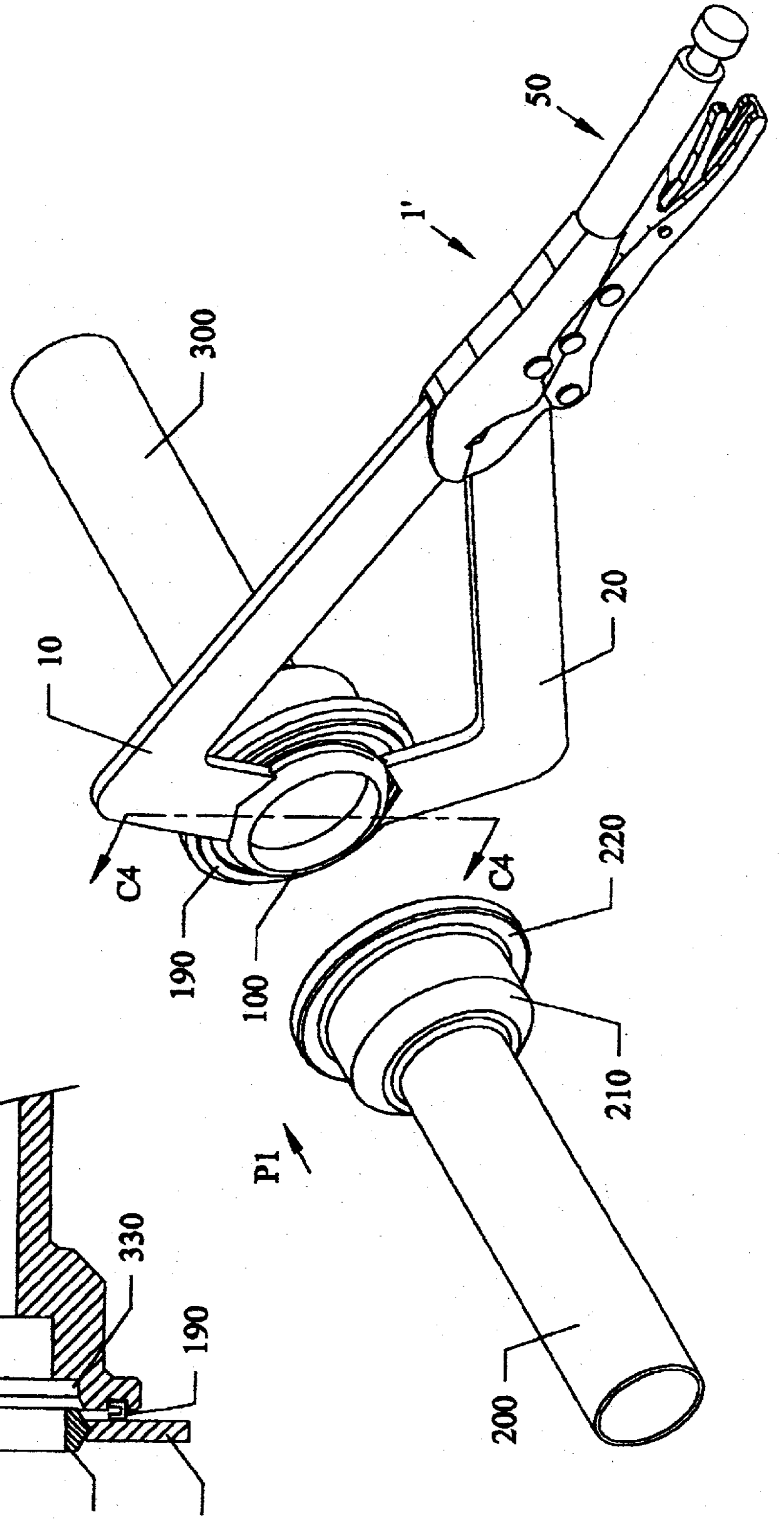
FIG. 4A shows the tool of the preceding figures positioning the seal into an interior flange opening of a one of the hubs.

FIG. 4A shows the tool 1' of the preceding figures having been positioned within the seal 100 into an interior flange ledge 330 of a one of the hubs 320, after pipe 300 has been moved in the direction of arrow P2. Next, hub end 220 of pipe 200 is moved in the direction of arrow P1 so that interior flange ledge 230 abuts against seal ring 330.

Figure 4B:
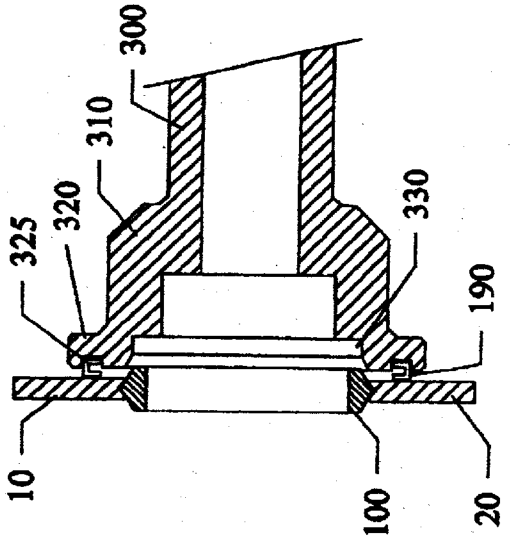
FIG. 4B is a cross-sectional view of clamp arms abutting against one of the hubs of FIG. 4A along arrow C4.

FIG. 4B is a cross-sectional view of the clamp arms 10, 20 abutting against one of the hubs 310, 320 of FIG. 4A along arrow C4. FIG. 4B shows the position of a second seal ring 190 that can be used between hubs 210, 220 and 310, 320. An optional extra seal ring 190 can be held in place within a mate able grooved gland 325 within hub end 320 by the flat sides of the clamp arms 10, 20. Thus, the flat sides of arms 10, 20 abut against and help keep the seal ring 190 within a gland 325 as the second hub 210, 220 is being moved in the direction of arrow P1 against the other side of ring 100. When the optional extra seal 190 is used both hub ends 220, 320 would have a mate able grooved gland portion 325.

Figure 5:
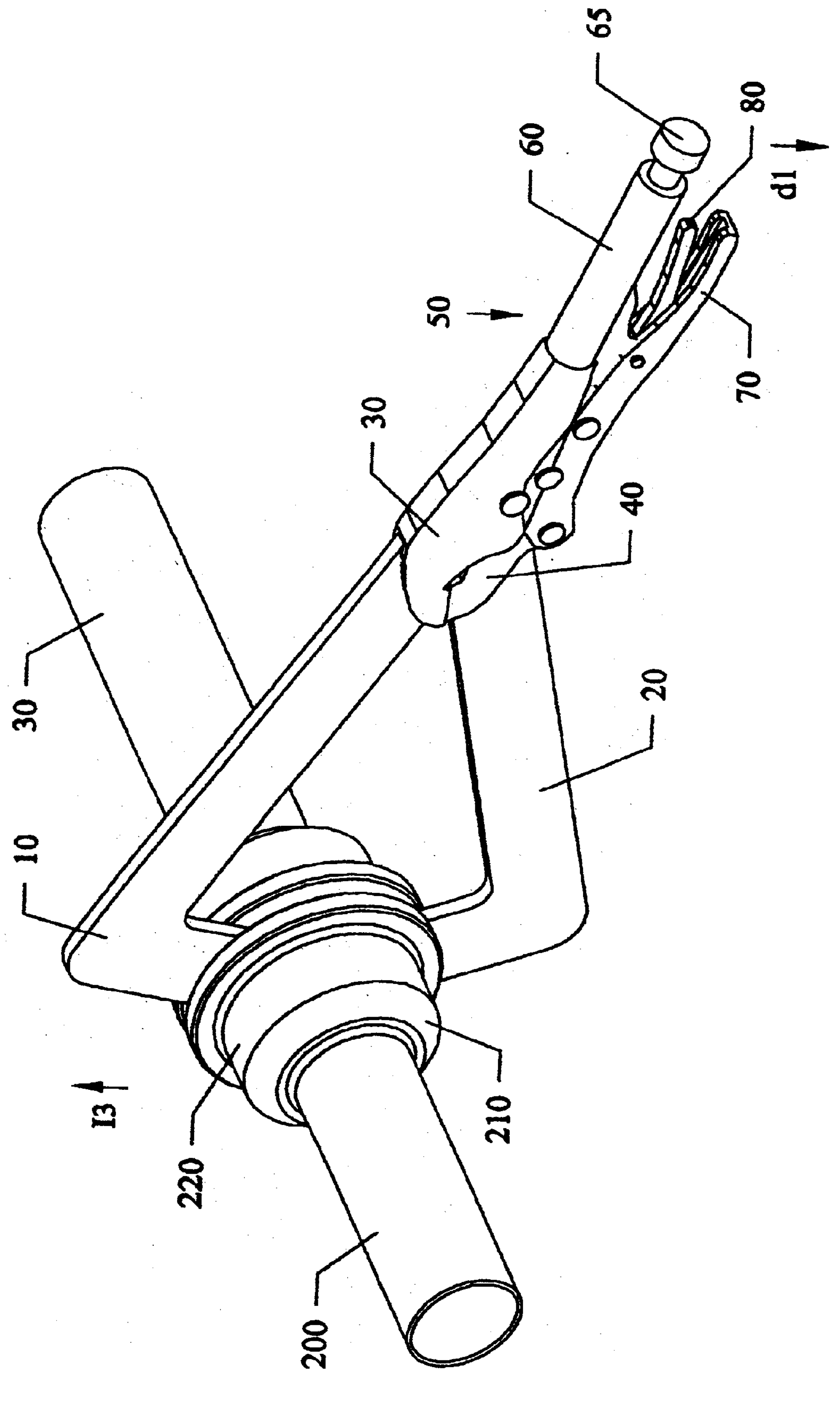
FIG. 5 shows the tool of the preceding figures with the seal located between the hubs, which are now positioned together and ready for clamp installation.

FIG. 5 shows the tool of the preceding figures with the seal ring 100 located and sandwiched between the hubs 210, 220 and 310, 320 after each of the pipes 200 and 300 have been positioned together. The hubs can be connected to one another by conventional clamps, and the like (not shown). As the hubs are drawn together, the sides of the seal ring 100 deflect against the inner surfaces 220, 330 of the hubs 210, 220, 310, 320. Finally, a light pressure on pivoting lever member 80 downward in the direction of arrow d1, can cause arms 10 and 20 of tool 1' to move outward from one another in the direction of arrows 13, 14, and allow tool 1 to be withdrawn. Rotating screw 65 on handle member 60 in either a clockwise direction or a counterclockwise direction adjusts the fixed opening O between clamping ends 15, 25 of arms 10, 20.

The invention can also have different arms that can be interchangeably mounted on the pliers, such as but not limited to screwing the arms to the nose portions of the pliers. The arms can have ends of various indentations and angles to fit various sized seals.

While the preferred embodiment describes a metal type device, the invention can also be made from other materials such as but not limited to a pliers and arm attachments, separately or as one piece made from injection molded plastic, and the like.

Although the preferred embodiment describes one type of angled longitudinal grooves, the dimensions of such can be scaled up or down to meet any size requirement for installing seal rings.

While the invention has been described, disclosed, illustrated and shown in various terms of certain embodiments or modifications, which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A tool assembly adaptable for providing a seal between two hubs, comprising:

a seal ring having spaced-apart inner and outer surfaces of substantially curved configuration;

a tool having first and second elongated arms pivotally attached to one another;

the first and second elongated arms each having an end portion configured to support a portion of the seal ring curved outer surface, wherein each end portion includes a flat tipped edge and the seal ring has a rib portion contacting each flat tipped edge; and means for lightly clamping without compressing the seal ring between the outer end portions of the tool, whereby the seal ring remains in its original configuration as it is positioned between the two hubs.

2. The tool assembly according to claim 1, wherein the end portions of the tool are each have a width approximately the same as a width of the seal ring.

3. The tool assembly according to claim 1, wherein the end portions each include a concave angled end adaptable for contacting the outer surface of the seal ring.

4. The tool assembly according to claim 3, wherein each concave angled end forms an angle of between approximately 90 and 170 degrees.

5. The tool assembly according to claim 1, wherein each end portion includes a longitudinal groove and the seal ring has a ribless portion contacting opposite sides of each longitudinal groove.

6. The tool assembly according to claim 1, wherein the lightly clamping means comprises a handle assembly attached to each of the first and second elongated arms for pivotally moving one of the end portions relative to the other end portion.

7. The tool assembly according to claim 6, wherein the handle assembly includes means for adjustably determining an opening between the end portions that is sufficient to lightly clamp a seal ring without compression.

8. A tool assembly for installing seal rings between two hubs, comprising:

an elongated first arm have a concave indentation and an elongated second arm have a concave indentation, with the first and second elongated arms pivotally attached to one another' the elongated first and second arms having further, bent portions disposed so that the concave indentations generally face one another, wherein each concave indentation includes a longitudinal groove and further includes substantially flat ends on either side of the longitudinal groove; and means for pivoting the elongated first and second arms toward one to lightly clamp and support without compressing a seal ring disposed between the concave indentations.

9. The tool assembly according to claim 8, wherein the means for pivoting comprises a handle attached to each of the elongated first and second arms.

* * * * *